Patented June 23, 1942

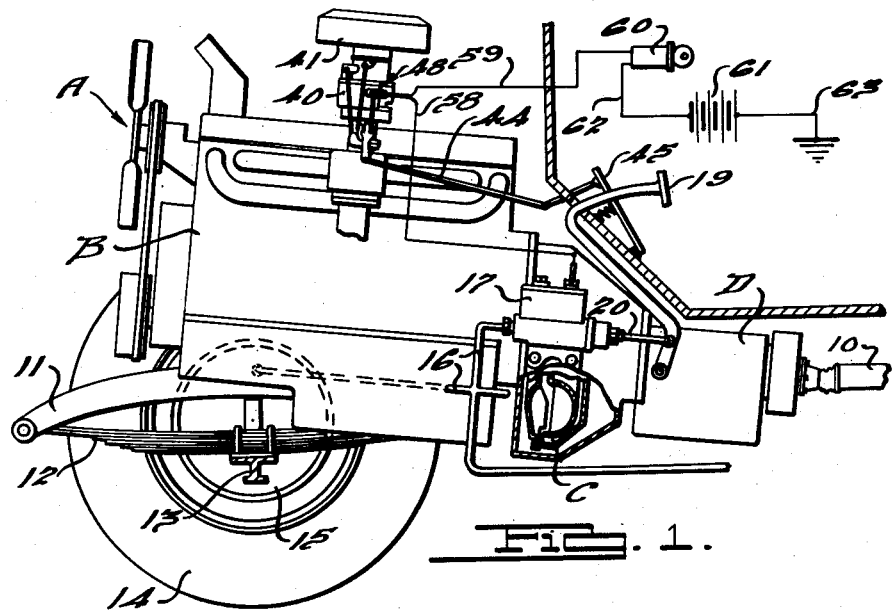

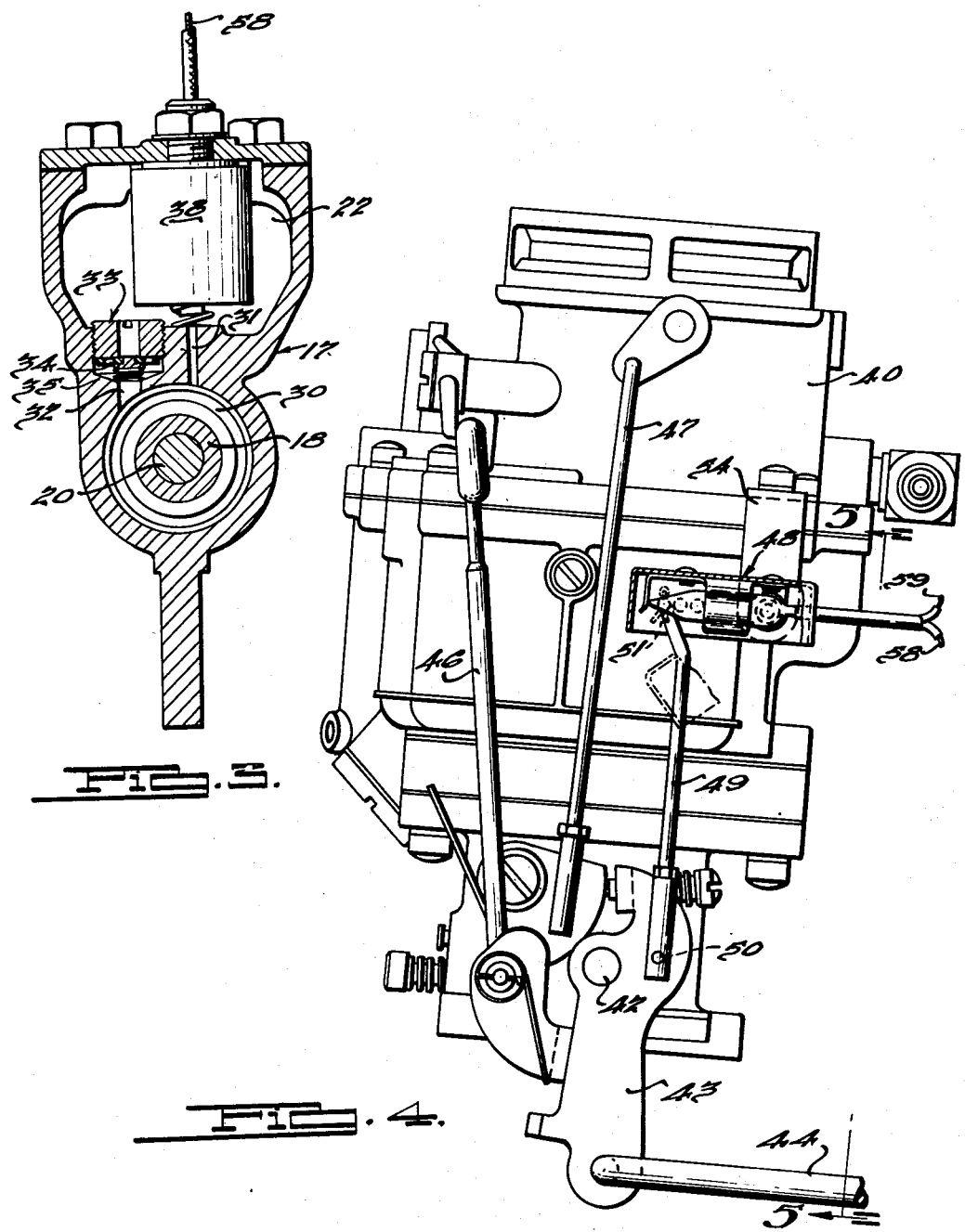

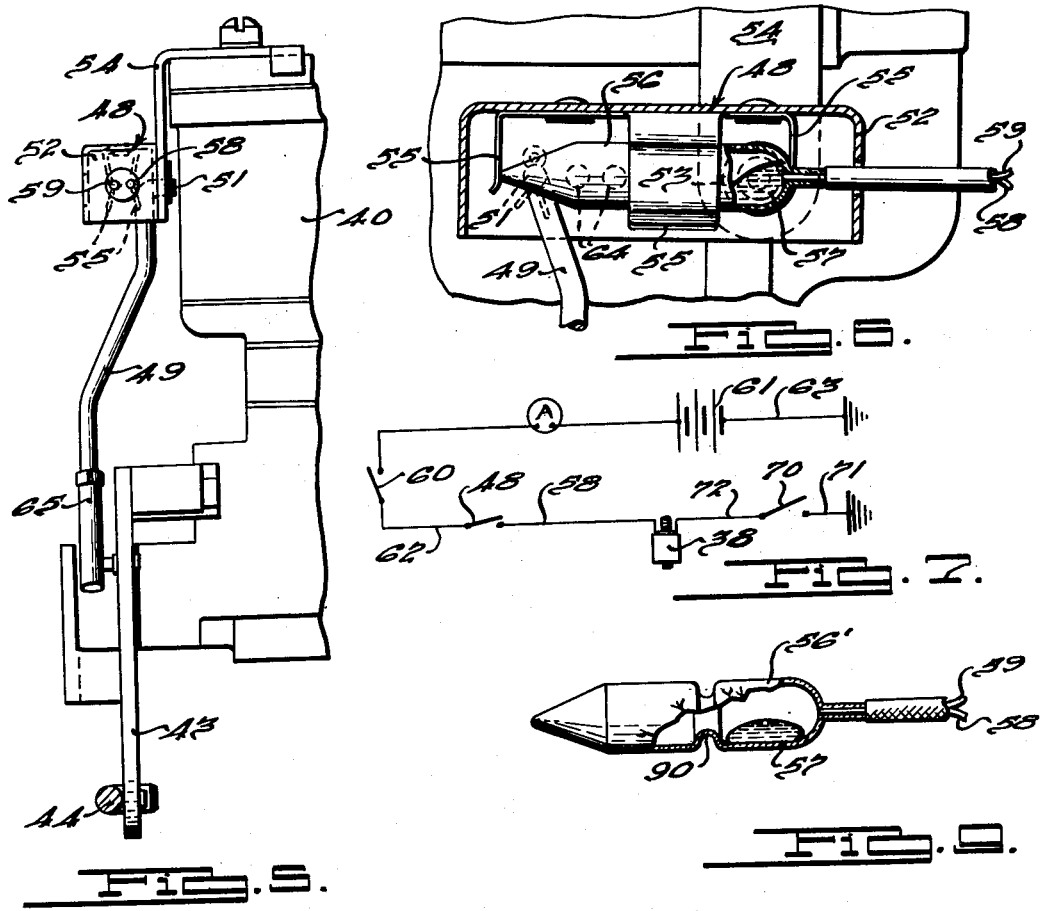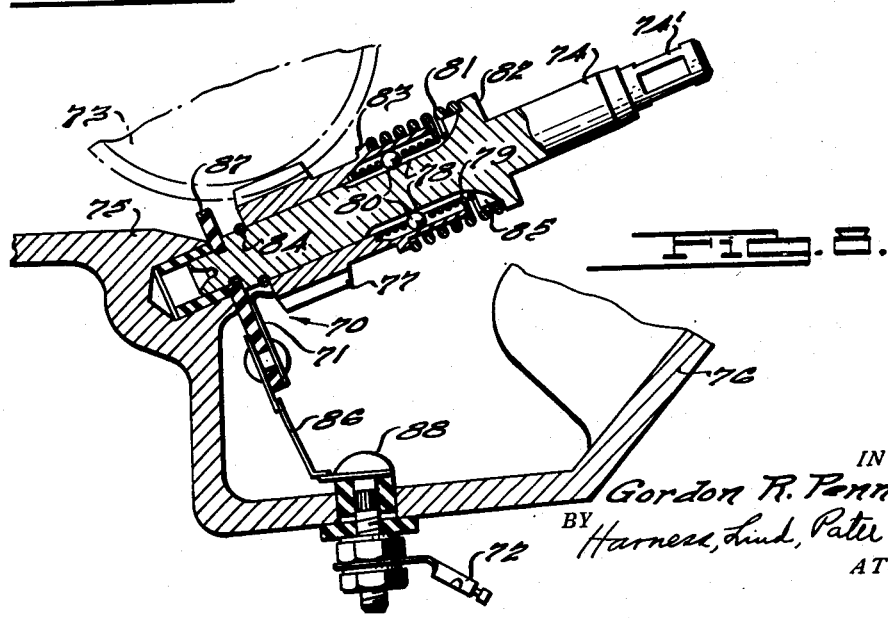

2,287,562

UNITED STATES PATENT OFFICE 2,287,562

BRAKE CONTROL

Gordon R. Pennington, Birmingham, Mich., assignor to Chrysler Corporation, Highland Park, Mich., a corporation of Delaware Application November 1, 1939, Serial No. 302,289

23 Claims. (Cl. 192—3)

The invention relates to a brake control device for motor vehicles equipped with fluid pressure actuated brakes.

It relates particularly to a brake control device and control means therefor, by means of which the service brakes of a vehicle equipped with the device may be held in their "on" position after the brake pedal has been released.

It is the principal object of the present invention to provide a brake control device which will act to hold the vehicle service brakes in "on" position after release of the brake pedal by the driver provided that the vehicle has been brought to a stop or nearly so.

An additional object is to provide, in such a device, control means which will prevent operation of the holding device except under conditions when the vehicle is being brought to a stop, thus making it impossible for the brakes to be held in their "on" position under conditions when the vehicle brakes are applied momentarily in order to slow down the speed of the vehicle without bringing it to a full stop.

The present invention is particularly adapted for use with cars equipped with a fluid coupling for transmitting the drive of the engine to the transmission mechanism. Although the slip in a fluid coupling is high at engine idling speed, under ordinary conditions there is enough torque transmitted by the circulating fluid to cause the vehicle to "creep" when stopped with the transmission in gear unless the clutch is disengaged or the brakes are applied. Various expedients have been resorted to in an effort to eliminate this undesirable creeping tendency, such as automatic clutch release devices, evacuation of the coupling at idling speed, etc. These expedients, while satisfactory from an operating standpoint, involve the installation of additional cylinders, valves, etc., which are liable to get out of order and are costly. It is accordingly a further object of the invention to provide a fool-proof and inexpensive anti-creep device which permits the utilization of apparatus already installed in practically all motor vehicles and which requires the installation of only a few extra parts for its functioning.

Reference is made to the accompanying drawings which illustrate a preferred embodiment of the device, in which:

Fig. 1 is a fragmentary side elevational view of a motor vehicle showing a typical installation of the brake control device; the electrical wiring being shown in diagrammatic form.

Fig. 2 is an enlarged sectional view of the brake master cylinder of Fig. 1.

Fig. 3 is a sectional view along line 3—3 of Fig. 2.

Fig. 4 is an enlarged elevational view of the carburetor and throttle control of Fig. 1.

Fig. 5 is a rear elevational view taken in the direction of the arrows 5—5 in Fig. 4.

Fig. 6 is an enlarged sectional view of the mercury switch of Figs. 1, 4 and 5.

Fig. 7 is a wiring diagram of a modified form of the invention.

Fig. 8 is a sectional view of a speed controlled switch for use with said modification; and Fig. 9 is a part-sectional view of a modified form of capsule for use in the switch of Figs. 4, 5 and 6.

In the drawings, in which reference characters designate corresponding parts or elements in the following description, A designates generally a motor vehicle having an engine B and a fluid clutch C of the well known kinetic type for coupling the engine with the transmission D. A propeller shaft 10 drives the rear wheels (not shown) and the engine is mounted in a frame 11 which is supported at the front by a spring 12, axle 13 and road wheel 14 at each side thereof.

The vehicle service brakes, one of which is designated generally at 15, are actuated hydraulically through conduits 16 by fluid under pressure from a master cylinder in housing 17. The brake system is of well known type, the piston 18 (Fig. 2) being controlled by a brake pedal 19 through a connecting rod 20.

The brake master cylinder housing 17 encloses the master cylinder 21 and a reservoir 22 which is adapted to be filled with brake fluid by removal of the plug 23. The master cylinder is supplied from the reservoir through a bleed passage 24 which also permits the escape of air bubbles. Movement of the piston 18 toward the left of Fig. 2 under the influence of the pedal 19 causes the valve 25 (which normally acts to maintain a slight pressure in the line 16) to open thereby admitting fluid under pressure into the line 16, and applying the vehicle brakes. Release of the pedal 19 will normally permit return of the piston 18 by action of the return spring 26, the valve member 27 unseating to allow return of the fluid from line 16.

So far as described, the fluid pressure brake system is similar to that supplied as standard equipment on several leading makes of automobiles. My novel brake control will now be described.

Referring to Figs. 2 and 3, it may be seen that piston 18 is provided with an annular sealing cup 27 of resilient material; a similar sealing cap 28 being fixed to the piston guide member 29. Both cups are provided with annular grooves forming a chamber 30 in rear of the piston which communicates with the reservoir 22 through passages 31 and 32. The passage 32 is obstructed by a one-way valve 33 which has a movable member 34 adapted to unseat against a spring 35 to permit fluid to flow into the chamber 30. The passage 31 is normally open for passage of fluid in both directions, but is adapted to be closed under certain conditions of vehicle operation by a plunger 36.

The plunger 36 is carried by the core 37 of a solenoid 38, the core and plunger being preferably biased upwardly by a spring 39 when the solenoid is de-energized thereby permitting unobstructed flow through passage 31. It may thus be seen that movement of the piston 18 forwardly in the master cylinder to apply the vehicle brakes will create a vacuum in the chamber 30 and cause fluid to enter the chamber through both passages 31 and 32. Upon release of the pedal 19, the piston 18 will be forced rearwardly by the spring 26 and the fluid in chamber 30 will flow back into reservoir 22 through the passage 31 provided that this passage is open. Energization of the solenoid 38 will cause the plunger 36 to move downwardly thereby closing passage 31 and trapping the fluid in chamber 30. Under these circumstances the piston 18 will be held against return after the pedal 19 is released and the vehicle brakes will be held in "on" position. De-energization of the solenoid will, of course, open the passage 31 to permit return of the piston and release the brakes. The solenoid 38 may be of any desired size to give any desired characteristics.

During this return movement, the bleed passage 24 is of course sealed by the piston 18. To prevent formation of a vacuum in the cylinder, which might prevent the piston from returning to its Fig. 2 position, a second one-way valve 33' may be provided. The valve 33' is identical to the valve 33 and acts to supply fluid from the reservoir 22 to the master cylinder when required, through a passage 32'. While the valve 33' is desirable to prevent a possible vacuum condition, experimental devices have proven entirely satisfactory in operation without such a valve.

The means for energizing and de-energizing the solenoid 38 under such conditions of vehicle operation as will produce a "no-creep" control will now be described.

Referring particularly to Figs. 1 and 4 it will be seen that the vehicle is provided with the usual carburetor 40 and air cleaner 41. The throttle valve control rod 42 has the usual control lever 43 for adjustment of the position thereof for accelerating the vehicle, the lever 43 being controlled by the accelerator pedal 45 through the intermediary of the rod 44. The carburetor 40 carries an acceleration pump actuated by a link 46 and a choke mechanism controlled by a link 47, and in addition to these conventional accessories, a switch mechanism 48 is mounted on the side of the carburetor in such position that it may be opened and closed by the link 49 which is pivotally connected to the lever 43 at 50 and to the switch mechanism at 51.

The switch 48 (Fig. 6) consists of a clip 52 pivoted at 53 in a bracket 54 carried by the carburetor. The clip 52 has a plurality of spring tabs 55 which receive a switch element 56. The latter preferably consists of a glass capsule 56 having a globule of mercury 57 therein. A pair of wires 58, 59 extend into one end of the capsule, as indicated in Figs. 5 and 6, in such manner that they are insulated from one another, but are adapted to be electrically interconnected by the globule 57 when it is in the rearward end of the capsule. The wire 59 is connected with the vehicle ignition switch 60, the latter being connected to one side of the vehicle battery 61 by a wire 62; the circuit to ground from the other side of the battery being completed by a wire 63. The wire 58 connects directly with the solenoid 38 which is grounded on one side in the usual manner. It is thus obvious that when the mercury globule 57 is in the rearward end of the capsule 56 the solenoid 38 is energized and the passage 31 is closed.

As may be seen from Fig. 1, the engine B is inclined downwardly and rearwardly of the vehicle thus giving the mercury switch 48 an initial tilt at engine idling position of the throttle lever 43 sufficient to cause the mercury globule 57 to remain in the rearward end of the capsule 56. The solenoid 38 is thus energized at engine idling speed. The clip member 52 is provided with a series of holes 64 (Fig. 6) for reception of the upper inwardly bent end 51 of the link 49 and the latter is provided with an adjustable connection 65 at its lower end (Fig. 5). By lengthening or shortening the effective length of the link 49 by means of the adjustable connection 65 and/or shifting the position of the end 51 in the holes 64, the initial tilt of the switch 48 may be varied as desired. It has been found by experiment that an initial inclination of 4-6 degrees downwardly and rearwardly from horizontal is satisfactory for ordinary operating conditions. In installations where the engine is mounted horizontally in the vehicle frame, the switch 48 may of course be given an initial tilt of 4-6 degrees, by adjustment of the link 49.

In describing the operation of the device let it be assumed that the vehicle is traveling in a forward direction at cruising speed with the accelerator pedal 45 depressed. The switch 48 under these conditions will be tilted downwardly and forwardly and the mercury globule 57 will be positioned in the forward end of the capsule 56 thus rendering the solenoid inoperative, the position of the parts in the master cylinder being as shown in Fig. 2. Release of the accelerator pedal 45 will restore the switch 48 to its initial position and the globule 57 will flow to the rearward end of the capsule 56 causing the solenoid 38 to be energized to close the passage 31. If the vehicle is then brought gradually to a stop on level ground, depression of the pedal 19, either before or after the vehicle has come to a stop, will cause fluid to enter the chamber 30 through passage 32. Release of the brake pedal under these conditions will not release the brakes because the piston 18 is retained in brake applying position by the trapped fluid in chamber 30. The vehicle will then be held against movement until the solenoid circuit is interrupted by depression of the accelerator pedal which, as explained above, will tilt the mercury switch forwardly to de-energize the solenoid.

If the vehicle is brought to a stop on an incline with the forward part thereof pointing upwardly, the device will operate as described and will act as a "no-back" or "hill-hold." If, however, the vehicle is stopped with the forward part thereof inclined downwardly, the device will not operate to hold the vehicle against forward movement unless the inclination thereof is less than that sufficient to cause the globule 57 to roll out of contact with the wires 58, 59. If the inclination of the vehicle is sufficient to roll the globule 57 to the forward end of the capsule 56, then the vehicle may be held stopped in the usual manner, by depression of the pedal 45 or by application of the emergency brake which is commonly provided.

A very important function of the switch 48 is to prevent energization of the solenoid 38 during braking of the vehicle on downgrades and under conditions when it is desired to slow down the speed of the vehicle without bringing it to a full stop. It is obvious that the holding control will be rendered inoperative on downgrades of substantial inclination because the connection between the wires 58, 59 will be broken. Sudden applications of the vehicle brakes, as when slowing down from high speed, will not cause the holding control to become operative even though the switch 48 is returned to idle position upon release of the accelerator pedal, because rapid deceleration of the car will cause the globule 57 to surge forwardly in the capsule, thus maintaining the solenoid circuit open until the deceleration ceases or becomes gradual. If the vehicle is rapidly decelerated to a full stop, the holding control will become operative as soon as the globule 57 flows back to the rear end of the capsule, which action will occur immediately upon cessation of the deceleration force.

It is thus apparent that, when used with vehicles equipped with fluid couplings, the above described holding control will act to control the vehicle in such manner that ordinary conditions of vehicle operation will be simulated and undesirable "creeping" due to the action of the fluid coupling will be avoided. In addition, an inherent "no-back" is provided which will hold the vehicle against downhill backward movement after the brakes have been applied to stop the vehicle. It may also be noted that the device does not in any way interfere with ordinary use of the brakes. If, for example, the vehicle is at rest with the holding control in operation and it is desired to increase the braking pressure, the pedal 19 may be actuated in the usual manner and the piston 18 moved further forwardly in the cylinder 21, additional fluid entering the chamber 30 through the passage 32 to accommodate the movement of the piston and hold it in its new position after the brake pedal has returned to released position.

Fig. 9 shows a modified form of capsule for the switch 48. In the Fig. 9 form, the capsule 56' is provided with a centrally disposed reduced portion 90 for preventing sudden surges of the globule 57 due to road shocks, etc. This type of capsule is adapted primarily for use on vehicles intended for operation on rough roads, but may be used in place of the capsule 56 under all conditions if desired. With the capsule 56' there is less danger of unintentional operation of the holding control during short, sudden reversals of inertia such as when a backward lurch of the vehicle occurs between successive forward lurches during intermittent braking.

Figs. 7 and 8 illustrate a modification of the invention in which, in addition to the accelerator actuated switch 48, an additional switch 70 is connected in the ground circuit of the solenoid 38 to prevent energization of said solenoid unless the vehicle is at a full stop. When the switch 70 is used, the switch 48 need not be a mercury switch as illustrated, but may, if desired, be of any well known type that will close at idle position of the throttle and open immediately upon depression of the accelerator pedal.

Fig. 8 illustrates a switch mechanism which will connect the solenoid to ground when the vehicle is stationary, but will interrupt the circuit immediately upon rotation of the drive shaft and will maintain said circuit open until the vehicle is again stopped.

In Fig. 8, 73 designates the regular speedometer drive worm of the vehicle transmission. The speedometer drive shaft 74 is journaled in a boss 75 in the transmission casing 76 and carries a helical pinion 77 in mesh with the worm 73. Ordinarily the pinion 77 would be integral with the shaft 74, to the outer end 74' of which the flexible speedometer drive cable is attached. For the purposes of the present invention, however, the pinion 77 is splined to the shaft 74 by means of a ball spline 78, a spring 79 being provided to maintain the balls 80 spaced substantially centrally of the spline grooves. A coiled compression spring 81 surrounds the sleeve extension of the pinion 77 and bears against the enlarged annular shoulder portions of the shaft and pinion respectively. The spring 81 tends to force the pinion downwardly of the shaft 74 against the ring 84 and into contact with the spring contact element 71 carried by the insulating tab 87. The contact element 71 is connected to a binding post 88 by a short connector 86 and the binding post in turn carries a connector lug 72 which is connected to the ground side of the solenoid 38 as indicated in Fig. 7.

The tooth helix angle of the helical pinion 77 is chosen of such value and direction that the thrust on the pinion will be sufficient to move the pinion upwardly against the spring 81 until the upper end thereof engages the stop shoulder 85 as soon as the worm 73 starts to rotate. This axial movement of the pinion 77 is facilitated by the balls 80 and, although slight, is designed to be sufficient to break the contact between the lower end of the pinion and the spring element 71 thus breaking the ground circuit of the solenoid 38.

The operation of the Fig. 7 device is identical with that described above except that the solenoid 38 cannot become energized except when the vehicle is at a full stop.

While I have described two specific embodiments of my invention, I desire to point out that by so doing, I do not limit my invention in its broader aspects to the particular details shown, since other forms of switches, brakes, controls, etc. may be employed with the fundamental principles outlined herein.

I claim:
1. In an automotive vehicle having brake and accelerator pedals, a braking system including vehicle wheel brakes; apparatus operable by said brake pedal for applying said brakes; means for maintaining the application of said brakes after said brake pedal has been returned to its released position; mechanism operable by said accelerator pedal for controlling said means; and means including a fluid actuated switch operable automatically upon rapid deceleration of the vehicle for rendering said first means inoperable.

2. In an automotive vehicle having brake and accelerator pedals, a braking system including vehicle wheel brakes; apparatus operable by said brake pedal for applying said brakes; means for maintaining the application of said brakes after said brake pedal has been returned to its released position; and mechanism operable by said accelerator pedal for controlling said means; said mechanism including a mercury switch operable automatically upon forward downward inclination of the vehicle for rendering said first means inoperable.

3. In an automotive vehicle having a brake pedal, a hydraulic braking system including wheel brakes and a master cylinder having a piston operable by said brake pedal for creating a pressure in said system for applying the wheel brakes; a reservoir having a passage communicating with said master cylinder in rear of said piston; and a releasable valve in said passage, said valve being operable when in closed position to cut off flow of fluid through said passage.

4. In an automotive vehicle having a brake pedal, a hydraulic braking system including wheel brakes and a master cylinder having a piston operable by said brake pedal for creating a pressure in said system for applying the wheel brakes; a fluid reservoir; a passage interconnecting said reservoir and said cylinder for permitting flow of fluid into said cylinder in rear of said piston but preventing return flow; a second passage interconnecting said reservoir and cylinder rearwardly of said piston for permitting flow of fluid in both directions; a valve for closing said second passage; a solenoid for controlling said valve; and means for automatically energizing said solenoid upon stopping of the vehicle.

5. In an automotive vehicle having a hydraulic braking system including a master cylinder, a piston in said master cylinder adapted for manual operation forwardly to create pressure in said braking system; a fluid reservoir; a passage interconnecting said reservoir with said cylinder rearwardly of said piston whereby fluid flows into said cylinder in rear of said piston when the latter is actuated forwardly to apply the brakes; means for closing said passage to prevent release of said brakes comprising a valve member and a solenoid disposed within said reservoir for operating said valve member.

6. In an automotive vehicle having accelerator and brake pedals, a braking system including wheel brakes; apparatus operable by said brake pedal for applying said brakes; electrically operated means for maintaining the application of said brakes after said brake pedal has been returned to its released position; and a switch operated by said accelerator pedal for controlling said electrically operated means; said switch comprising a capsule of insulating material having a pair of contacts at one end thereof and a globule of mercury disposed in said capsule and adapted to close the circuit between said contacts when said capsule is inclined in one direction and to open said circuit when said capsule is inclined in the opposite direction.

7. In an automotive vehicle having accelerator and brake pedals, a braking system including wheel brakes; apparatus operable by said brake pedal for applying said brakes; electrically operated means for maintaining the application of said brakes after said brake pedal has been returned to its released position; and a switch operated by said accelerator pedal for controlling said electrically operated means; said switch comprising a capsule of insulating material having a pair of contacts at one end thereof and a globule of mercury disposed in said capsule and adapted to close the circuit between said contacts when said capsule is inclined in one direction and to open said circuit when said capsule is inclined in the opposite direction; said capsule being operably associated with the accelerator pedal and so arranged that said globule is adapted to be moved out of engagement with said contacts upon rapid deceleration of the vehicle, during forward inclination of the vehicle and upon depression of the accelerator pedal to accelerate the vehicle.

8. In an automotive vehicle having accelerator and brake pedals and a driving shaft, a braking system including wheel brakes; apparatus operable by said brake pedal for applying said brakes; electrically operated means for maintaining the application of said brakes after said brake pedal has been returned to its released position; a switch operated by said accelerator pedal for releasing said brakes; and a second switch controlled directly by said driving shaft for rendering said electrically operated means inoperative while said vehicle is moving.

9. In combination with a motor vehicle having fluid pressure brakes, a source of pressure fluid comprising a master cylinder and a piston reciprocable therein; a fluid reservoir; a passage interconnecting said reservoir with said cylinder rearwardly of said piston, said passage having a valve therein for permitting flow of fluid into said cylinder but closing said passage against return flow; a second passage interconnecting said reservoir with said cylinder forwardly of said piston, said second passage having a valve therein for permitting flow of fluid into said cylinder but closing said passage against return flow; a third passage interconnecting said reservoir with said cylinder rearwardly of said piston, and valve means for closing said third passage.

10. In combination with a motor vehicle having fluid pressure brakes, a source of pressure fluid comprising a master cylinder and a piston reciprocable therein; a pedal for moving said piston forwardly to apply said brakes; a fluid reservoir; a passage interconnecting said reservoir with said cylinder rearwardly of said piston; a one-way valve in said passage for permitting flow of fluid into said cylinder only; a second passage interconnecting said reservoir with said cylinder rearwardly of said piston; means for closing said second passage against flow of fluid in either direction; a third passage interconnecting said reservoir with said cylinder forwardly of said piston; a one-way valve in said third passage for permitting flow of fluid into said cylinder only; a fourth passage interconnecting said reservoir with said cylinder forwardly of said piston, said fourth passage being unrestricted in the normal position of said piston but closed upon initial forwardly movement of said piston.

11. In combination with a motor vehicle having fluid pressure brakes, a source of pressure fluid comprising a master cylinder and a piston reciprocable therein; a pedal for moving said piston forwardly to apply said brakes; a fluid reservoir; a passage interconnecting said reservoir with said cylinder rearwardly of said piston; a one-way valve in said passage for permitting flow of fluid into said cylinder only; a second passage interconnecting said reservoir with said cylinder rearwardly of said piston; means for closing said second passage against flow of fluid in either direction; comprising a valve member and a solenoid for operating said valve member; and means independent of said pedal for controlling said solenoid.

12. In combination with a motor vehicle having fluid pressure brakes, a source of pressure fluid comprising a master cylinder and a piston reciprocable therein; a pedal for moving said piston forwardly to apply said brakes; a fluid reservoir; a passage interconnecting said reservoir with said cylinder rearwardly of said piston; a one-way valve in said passage for permitting flow of fluid into said cylinder only; a second passage interconnecting said reservoir with said cylinder rearwardly of said piston; means for closing said second passage against flow of fluid in either direction; and means independent of said passages for admitting fluid from said reservoir into said cylinder forwardly of said piston in response to the creation of a vacuum therein.

13. In combination with an automotive vehicle having an instrumentality thereon adapted to be electrically controlled; circuit forming means operably associated with said instrumentality including a capsule having a pair of contacts extending into the interior thereof; a globule of mercury in said capsule adapted to form a circuit between said contacts upon inclination of the capsule to cause the mercury to flow toward said contacts, means mounting said capsule on the vehicle such that rapid deceleration of said vehicle will cause the globule to move away from said contacts and break said circuit, said capsule being provided with a restricted portion between its ends for retarding undesired movement of the mercury caused by road shocks and the like.

14. In combination with an automotive vehicle having an instrumentality thereon adapted to be electrically controlled; circuit forming means operably associated with said instrumentality including a capsule having a pair of contacts extending into the interior thereof; a globule of mercury in said capsule adapted to form a circuit between said contacts upon inclination of the capsule to cause the mercury to flow toward said contacts, said capsule being so mounted on the vehicle that rapid deceleration of said vehicle will cause the globule to move away from said contacts and break said circuit; and manually operated means for varying the inclination of said capsule.

15. The combination set forth in claim 14 in which the capsule is provided with a restricted portion between its ends for retarding undesired movement of the mercury caused by road shocks and the like.

16. In combination with a motor vehicle having a braking system, a pedal for controlling application of the brakes; electrically controlled means for maintaining application of said brakes after said pedal has been returned to its released position; a switch element operably associated with said electrically operated means; said switch element comprising a capsule having contacts at one end thereof and enclosing a globule of mercury adapted to engage said contacts upon inclination of said capsule toward said contacts, the normal disposition of said capsule being such that said globule tends to flow away from said contacts during rapid deceleration of said vehicle.

17. In an automotive vehicle having brake and accelerator pedals, a hydraulic braking system including means operable by the brake pedal for creating a pressure in said system; a valve adapted when closed to maintain the pressure in the system after release of said pedal; holding means for releasably holding said valve closed; means adapted for operation by the accelerator pedal for controlling said holding means, and means operable independently of the operation of said brake and accelerator pedals and operable only when said vehicle is in motion for rendering said holding means inoperative.

18. In an automotive vehicle having brake and accelerator pedals, a hydraulic braking system including means operable by the brake pedal for creating a pressure in said system; a valve adapted when closed to maintain the pressure in the system after release of said pedal; electrically operated holding means for releasably holding said valve closed; a switch adapted for operation by the accelerator pedal for controlling said holding means; and a second switch operable independently of the operation of said brake and accelerator pedals and in response to movement of the vehicle for rendering said holding means inoperative.

19. In an automotive vehicle having brake and accelerator pedals, a hydraulic braking system including means operable by the brake pedal for creating a pressure in said system; a valve adapted when closed to maintain the pressure in the system after release of said pedal; holding means inoperable during movement of the vehicle for releasably holding said valve closed, and means adapted for operation by the accelerator pedal for controlling said holding means.

20. In vehicle brake mechanism, a master cylinder comprising a single casting including a cylinder and a reservoir; a piston reciprocable in the cylinder; a passage connecting said reservoir and cylinder in front of said piston; a second passage connecting said reservoir and cylinder in rear of said piston; valve means in said reservoir operably associated with said second passage for closing the same, and means controllable from outside said reservoir for controlling said valve means.

21. In vehicle brake mechanism, a master cylinder comprising a single casting including a cylinder and a reservoir; a piston reciprocable in the cylinder; a passage connecting said reservoir and cylinder in front of said piston; a second passage connecting said reservoir and cylinder in rear of said piston; a solenoid disposed in said reservoir; and means operable by said solenoid for closing said second passage.

22. The combination set forth in claim 20 wherein said first passage has a check valve associated therewith for permitting fluid to flow from said reservoir to said cylinder, but preventing reverse flow.

23. In vehicle brake mechanism, a master cylinder comprising a single casting including a cylinder and a reservoir; a piston reciprocable in the cylinder; a passage connecting said reservoir and cylinder in front of said piston and so disposed relatively thereto that said passage is closed upon forward movement of said piston; a second passage connecting said reservoir and cylinder in rear of said piston; valve means in said reservoir operably associated with said second passage for closing the same, and means controllable from outside said reservoir for controlling said valve means.

GORDON R. PENNINGTON.